United States Patent [19]
Tsuruta

[11] Patent Number: 5,345,284
[45] Date of Patent: Sep. 6, 1994

[54] ELECTRONIC FLASH UNIT WITH TWO INTEGRATED FLASH HEADS

[76] Inventor: Yuzo Tsuruta, 2-23-9 Asamino, Midori-Ku, Yokohama, 227, Japan

[21] Appl. No.: 877,257

[22] Filed: Apr. 28, 1992

Related U.S. Application Data

[63] Continuation of Ser. No. 656,561, Feb. 15, 1991, abandoned.

[30] Foreign Application Priority Data

Feb. 16, 1990 [JP] Japan ............... 2-13716[U]

[51] Int. Cl.⁵ ............................. G03B 15/03
[52] U.S. Cl. ...................... 354/132; 354/149.1
[58] Field of Search ............. 354/132, 149.1, 149.11

[56] References Cited

U.S. PATENT DOCUMENTS 4,987,433 1/1991 Gandrud .................. 354/132

Primary Examiner—David M. Gray
Attorney, Agent, or Firm—Rockey, Rifkin and Ryther

[57] ABSTRACT

An integrated flash head having a ring flash for taking shadowless pictures and a bar flash for taking contoured pictures. The bar flash is pivotably mounted on the ring flash housing and the ring flash housing is movable relative to the camera lens to change the orientation of the bar relative to the camera lens. An electrical circuit is provided for selectively activating either the ring flash or bar flash.

11 Claims, 3 Drawing Sheets

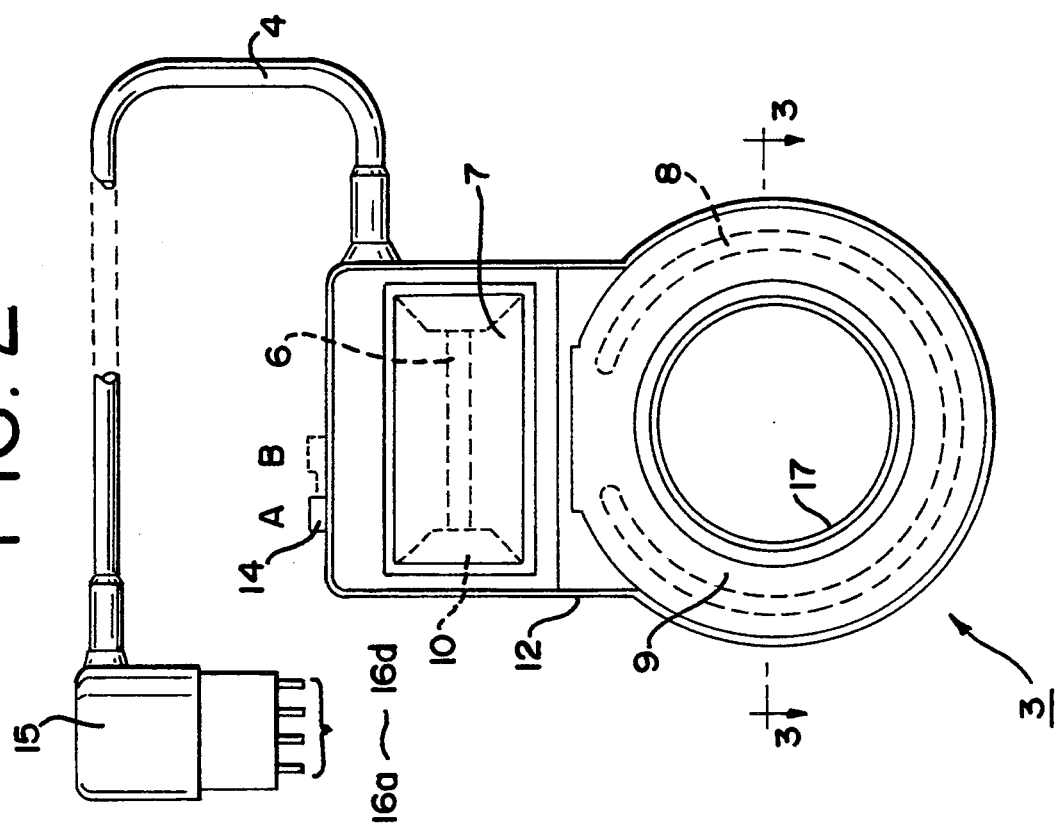
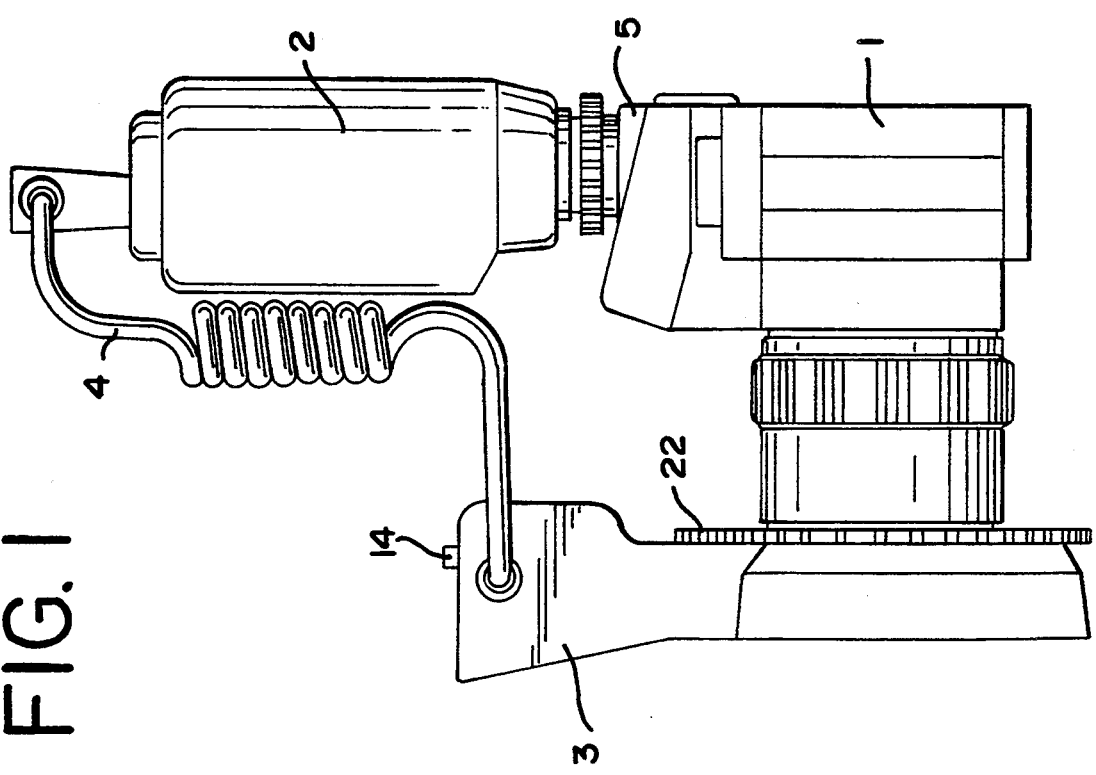

ELECTRONIC FLASH UNIT WITH TWO INTEGRATED FLASH HEADS

This is a continuation of copending application Ser. No. 07/656,561 filed on Feb. 15, 1991, now abandoned.

Background Of The Invention

The invention relates, generally, to electronic flash units for photographic equipment and, more particularly, to a flash unit having a ring shaped flash tube attached to the lens collar of the camera and a bar shaped flash tube movably mounted on the ring shaped flash tube.

It is common in the medical field and the like to photograph the subject at extremely close range. Ring flashes are particularly useful in this type of close up ("macro") photography because photographs taken with a ring flash are virtually shadowless. This is because the light emitted by the ring flash travels parallel to the photographic light axis, i.e. along the axis of the lens.

While shadowless close-up photography is useful, it is often desirable to take close up photographs having shadows in order to show contours or to create a sense of proportion and depth. To produce shadows, a bar flash may be used because it directs light on the subject at an angle relative to the photographic light axis. By changing the lighting angle of the bar flash, contoured pictures of the subject can be made.

With the known devices, either the ring flash or bar flash must be independently prepared depending on the type of photography desired. This independent preparation is time consuming. Moreover, preparing both flashes regardless of the type of photography employed is uneconomical. Finally, the known bar flashes are mounted in a fixed location relative to the lens. As a result, when using the prior art systems, it is necessary to move the entire camera to change the direction from which the light strikes the subject.

Thus an electronic flash device for use with cameras that is simpler and more economical to use than the known devices is desired.

SUMMARY OF THE INVENTION

The flash device of the invention overcomes the above-noted shortcomings of the prior art by providing an integrated flash head that can take both shadowless and contoured pictures. A ring flash head is attached to a camera lens collar and a bar flash is movably secured to the ring flash head. Either the ring flash or the bar flash can be operated to take either shadowless or contoured photographs respectively. An electrical circuit controls the operation of the flash unit.

BRIEF DESCRIPTION OF THE DRAWINGS

FIG. 1 shows a side view of a camera having an electronic flash unit of the invention mounted thereon.

FIG. 2 shows a front view of a flash unit of the invention.

DETAILED DESCRIPTION OF THE INVENTION

Figure 3:
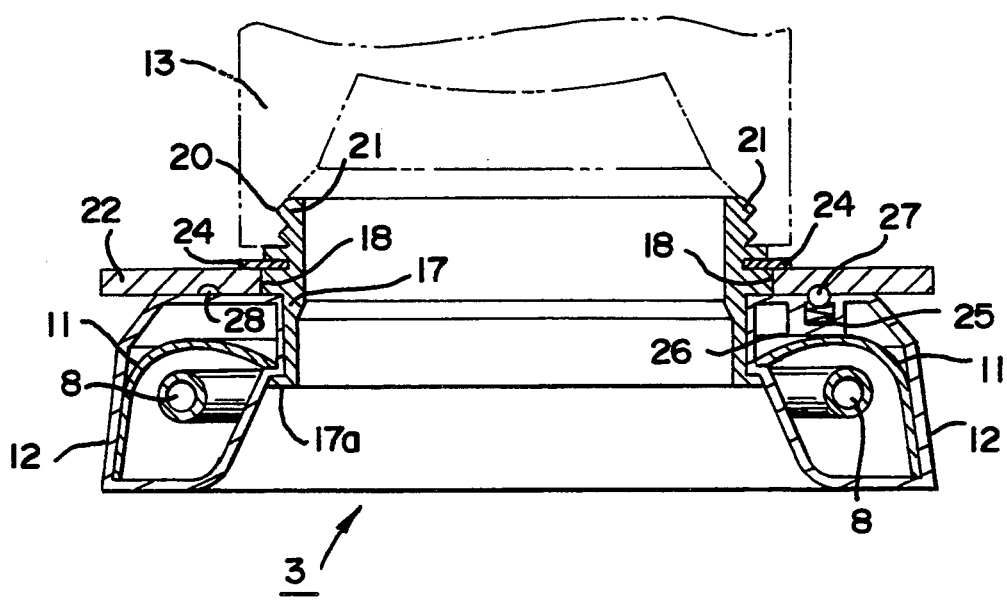
FIG. 3 shows a section view of a flash unit of the invention taken along line 3—3 of FIG. 2.

FIGS. 1 and 2 show a camera 1 having the electronic flash unit of the invention attached thereto. The flash unit of the invention consists of a flash body 2 mounted on camera 1 and a flash head 3 mounted on the camera lens. An electrical cord 4 including both power supply lines and synchronous control lines connects the flash head 3 to flash body 2.

The flash body 2 is a power supply consisting of AC-DC converter, main capacitor, batteries and other electrical components as will be understood by one skilled in the art. Flash body 2 is connected to, for example, a hot shoe 5 of camera 1 as is known in the photographic field.

As best shown in FIG. 2, flash head 3 consists of a first flash part 7 equipped with a bar shaped flash, for example, a bar shaped Xenon gas-filled flash tube 6, and a second flash part 9 equipped with a ring shaped flash, for example, a ring shaped Xenon gas filled flash tube 8. First flash part 7 and second flash part 9 include reflectors 10 in a rectangular frame and ring shaped frame, respectively. The first and second flash parts are covered with a transparent lens material that may optionally be integrally formed with flash head 3.

Figure 4:
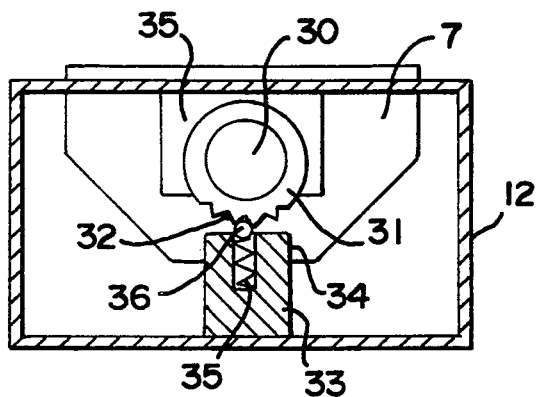
FIG. 4 shows a section view taken along line 4—4 of FIG. 2.

As best shown in FIG. 4, bar flash part 7 includes pivot shafts 30 (only one of which is illustrated) extending from opposite ends thereof. Pivot shafts 30 are pivotably mounted in mounts 35 which are fixed to the interior of flash case 12. A stop plate 31 having a plurality of gear teeth 32 formed about the periphery thereof is fixed to the end of pivot shaft 30. A stop mount 33 is fixed to the interior wall of case 12 opposite to mount 35 and is formed with a bore 34 extending perpendicularly to shaft 30 and aligned with stop plate 31. A compression spring 35 supports a ball 36 such that the ball 36 is forced into engagement with gear teeth 32. The force exerted by spring 35 is sufficient to maintain the position of flash part 7. When the camera operator exerts an external force on the flash part 7 gear teeth 32 act as camming members forcing ball 36 into bore 34 and thereby allow flash part 7 to pivot relative to case 12.

Flash head 3 is attached to lens collar 13 of camera 1 as best shown in FIG. 3. Referring to FIG. 2, a switch 14 is located in the upper side of first flash part 7 to selectively switch the flash unit of the invention between a first mode where the bar shaped flash operates and a second mode where the ring shaped flash operates. Cord 4 is connected to the side of flash head 3 by inserting terminals 16a–16d on connector 15 in mating receptacles formed on flash head 3 to thereby provide an electrical connection between flash head 3 and flash body 2.

Figure 5:
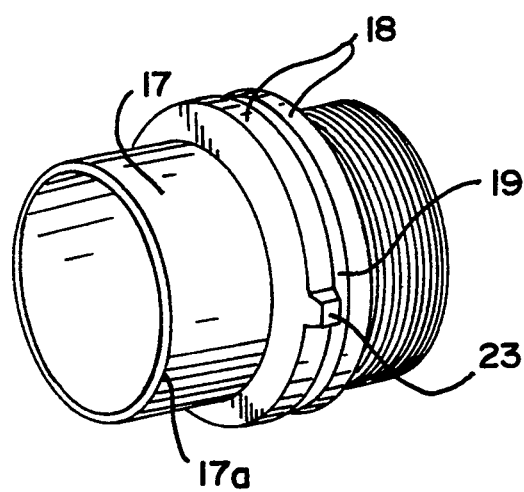
FIG. 5 shows an isometric view of the barrel axis.

Referring more particularly to FIGS. 3 and 5, the mounting for the flash unit of the invention consists of a cylindrical barrel member 27 having a protrusion 18 extending from the periphery thereof and having a key 23 found thereon. Attached to protrusion 18 an the side opposite barrel 27 is a screw mount 20. Screw mount 20 can removably engage screwthreads formed on the inside of long barrel lip 13.

Figure 6:
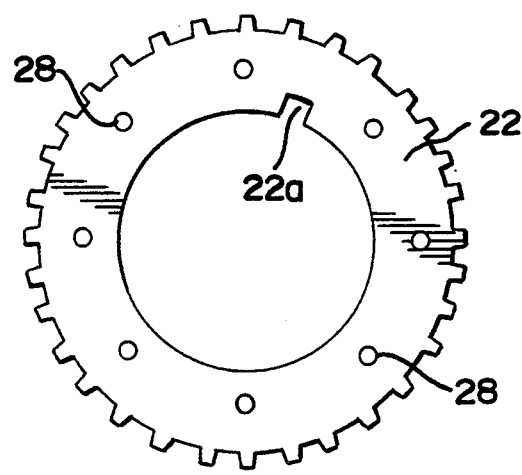
FIG. 6 shows a detailed view of a fixing plate useful in the flash unit of the invention.

A groove 18a is formed in the protrusion 18 and extends around the entire periphery of the mounting unit. Groove 18a is dimensioned to receive stopper ring 24. A ring shaped fixing plate 22, best shown in FIG. 6, is fit over protrusion 18 such that key groove 22a engages key 22 to thereby prevent the rotation of fixing plate 22 relative to protrusion 18. Stopper ring 24 prevents fixing plate 22 from moving laterally relative to protrusion 18 in a first direction. Finally, fixing ring 22 includes a plurality of stopper holes 28, the function of which will be hereinafter described. In the preferred embodiment eight stopper holes 28 are used although it will be understood by one skilled in the art that a greater or fewer number may be used as desired.

Mounted on the barrel axis 17 is flash housing 3. Flash housing 3 consists of an annular casing 12 dimensioned so as to slidably engage barrel axis 17. Flash ring 8 is located within housing 12. A reflective member is disposed behind flash ring 8 and a transparent cover encloses casing 12 such that when flash ring 8 is operated, light will be directed from housing 12 parallel to barrel axis 17.

The outer portion of barrel axis 17 is bent so as to form a lip 17a that engages a mating lip formed on housing 12. By this arrangement, housing 12 is prevented from moving laterally relative to barrel axis 17 yet can rotate relative thereto.

The back side of housing 12 abuts stopper ring 22 and includes a concave recess 25. Recess 25 supports a small ball bearing 27 that is forced outward beyond the plane of the back surface of the housing by a small compression spring 26. The ball bearing 27 can releasably engage holes 28 formed on stopper ring 22 to hold the flash ring 3 in position relative to barrel axis 12. When a change in the orientation of flash ring 3 relative to barrel axis 17 is desired, the force rotating housing 12 relative to barrel axis 17 will, by a camming action of the ring 28 with ball bearing 27, force ball bearing 27 out of hole 28 and into recess 25. When a second hole 28 is aligned with ball bearing 27 the spring 26 will force ball bearing 27 into engagement with hole 28 to clicklock housing 12 securely into position.

Because bar flash 6 is fixed to housing 12, as illustrated in FIG. 2, rotation of housing 12 changes the orientation of bar flash 6 about the axis of the camera lens. In this manner different lighting effects can be obtained without moving the camera and while maintaining the orientation of ring flash relative to the camera lens.

Figure 7:
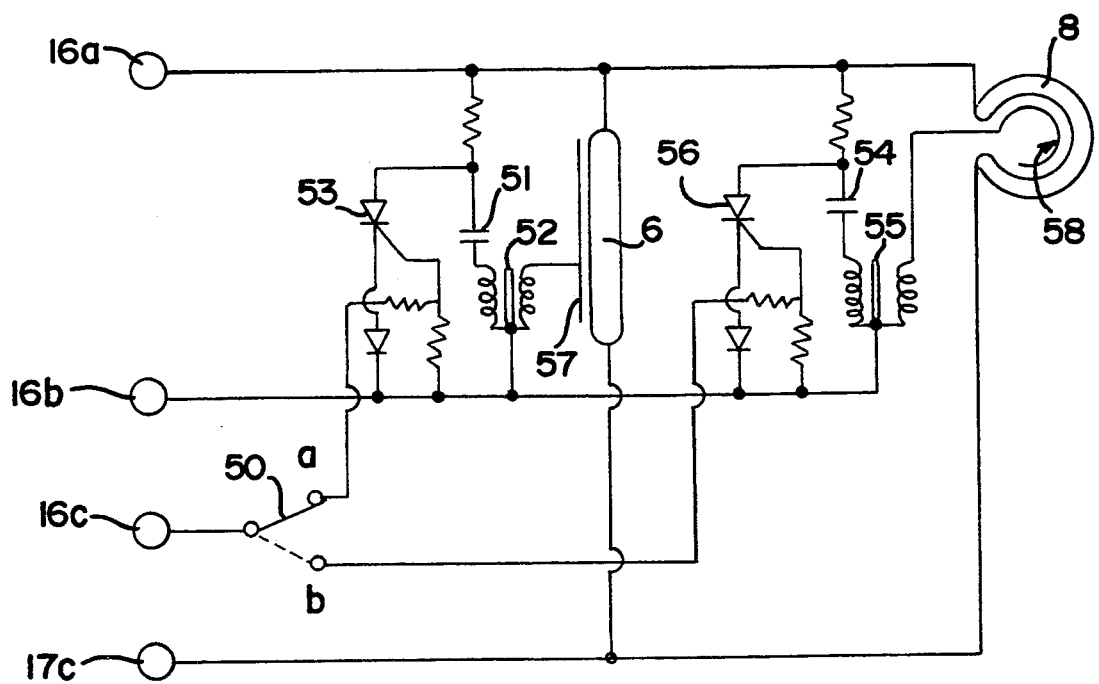
FIG. 7 a circuit diagram of an electrical control useful in the flash unit of the invention.

To control the operation of the flash unit of the invention the circuit shown in FIG. 7 is provided. A terminal switch 50 is coupled to the terminal knob 14, shown in FIG. 2, such that movement of knob 14 between positions A and B results in the simultaneous movement of terminal switch 50 between contacts a and b whereby either the ring flash or bar flash can be activated.

The bar flash tube 6 is triggered by circuitry consisting of a capacitor 51, a transformer 52 and a switching element SCR 53. The ring flash tube 8 is triggered by circuitry consisting of a capacitor 54, a transformer 55 and a switching element SCR 56.

When terminal knob 14 is set to position A to thereby activate bar shaped flash tube 6, the terminal switch 50 is connected to contact a. When the triggering signal from the camera is transmitted through terminals 16b and 16c, SCR 53 is turned to the conductive state. The voltage in capacitor 51 is discharged through the primary coil of transformer 52 to induce the high voltage pulse in a secondary coil of the transformer 52, charging the electrode 57. The bar flash tube is flashed by the discharge of energy from the main capacitor in flash body 2. The energy in the main capacitor is the oscillated direct voltage of the power source through the DC—DC converter from which it is charged to the predetermined voltage level (not shown).

Similarly, the ring flash tube 8 is flashed by moving knob 14 to the B position such that terminal switch 50 is moved to the b contact. When the trigger signal from the camera is transmitted through terminals 16b and 16c, the SCR 56 is set to conductive status and the charged voltage of the capacitor 54 is discharged through the primary coil of the transformer 55. As a result, the high voltage pulse is induced in the secondary coil to trigger the electrode 58. The ring tube 8, flashes as the energy of the main capacitor is discharged therethrough.

In operation the flash head 3 is secured to the camera lens collar 13 by rotating fixed plate 22 such that the thread mount 20 of flash head 3 engages the camera lens collar 3. The fixed plate 22 and barrel axis 17 rotate together as thread mount 20 is screwed onto threads 21 of the lens collar.

After flash head 3 is engaged with lens collar 13, the flash body 2 is engaged with the hot shoe 5 of camera 1 and the plug of connecting cord 4 is coupled with a receptacle located on flash body 2. The bar flash 6 is then positioned relative to the camera lens to obtain the desired contours by rotating housing 12 relative to fixing plate 22 and locking it into place by the engagement of ball bearing 27 with holes 28.

Even though bar flash 6 can be arranged at different positions relative to the camera lens, ring flash 8, because it surrounds the camera lens, will always provide light at a constant angle relative to the camera lens regardless of the position assumed by housing 12.

After setting the position of bar flash 6, pictures can be taken using either the ring flash or bar flash as desired. To photograph using the ring flash, knob 14 is set to position B. Release of the camera shutter causes ring flash 8 to flash thereby illuminating the subject of the picture along the path of the camera lens. Likewise, to photograph using the bar flash 6, the knob 14 is set to position A such that release of the camera shutter causes bar flash 6 to flash thereby illuminating the subject at an angle to the axis of the camera lens to create desired shadows and contours. By changing the position of bar flash 6 to the camera lens, lighting angles are changed resulting in creative contoured pictures.

while the invention has been described with particular reference to the figures it is to be understood that various charges and modifications could be made without departing from the invention. For example, a protrusion could be integrally formed on the back surface of housing 12, thereby eliminating the need for the separate ball bearing 27 and spring 25.

What is claimed is:

1. A flash unit for a camera of the type having a lens, comprising:
   a support member;
   means for releasably connecting the support member to the camera;
   a first flash means;
   a second flash means mounted to said first flash means;
   means for mounting said first flash means to said support member such that the angular position of the second flash means relative to the camera can be changed without removing the flash unit from the camera;

a first trigger circuit having a low voltage input and a high voltage output for triggering the first flash means;.

a second trigger circuit having a low voltage input and a high voltage output for triggering the second flash means and means in circuit with the low voltage side of both said first and second trigger circuits for selecting which of the trigger circuits respond to the camera flash output signal whereby operation of the camera simultaneously operates the selected first or second flash means.

2. The flash unit according to claim 1, wherein said first flash means includes a ring shaped flash tube extending around the circumference of the camera lens.

3. The flash unit according to claim 2, wherein said first flash means is mounted on the support means such that the ring shaped flash tube can be rotated relative to the camera lens.

4. The flash unit according to claim 1, wherein the means for coordinating includes an electrical circuit that can selectively energize either the first or second flash means.

5. The flash unit according to claim 1, wherein the second flash means includes a bar shaped flash tube mounted on said first flash means such that the flash from said second flash means is at an angle relative to the axis of the camera lens whereby contoured photographs can be taken.

6. The flash unit according to claim 1, wherein the means for mounting includes means for maintaining the position of said first flash means relative to said support member.

7. The flash unit according to claim 6, wherein said means for maintaining the position includes a movable member supported by said first flash means selectively engageable with one of a plurality of holes formed on the support member whereby rotation of said first flash means will disengage said movable member from said support member.

8. The flash unit according to claim 1, wherein the means for releasably connecting includes screwthreads formed on said support member matably engaging screwthreads formed on the camera.

9. The flash unit according to claim 5, further including means for adjusting the angle of said flash.

10. In a combination point flash and ring flash unit for a camera the improvement comprising:

a support member supporting both the point and ring flash including means for allowing the support member to rotate relative to the camera and be temporarily fixed in a plurality of positions relative to the camera and means for releasably connecting the support member to the camera;

a first trigger circuit having a low voltage input and a high voltage output for triggering the point flash;

a second trigger circuit having a low voltage input and a high voltage output for triggering the ring flash; and means in circuit with the low voltage side of both said first and second trigger circuits for selecting which of the trigger circuits respond to the camera flash output signal;

whereby operation of the camera simultaneously operates the selected first or second flash means.

11. In a dual flash unit having a camera which provides a flash output signal, said flash unit having both a bar flash and a ring flash thereon, the improvement comprising:

a. a first trigger circuit having a low voltage input and a high voltage output for triggering the bar flash;

b. a second trigger circuit having a low voltage input and a high voltage output for triggering the ring flash and;

c. means in circuit with the low voltage side of both said first and second trigger circuits for selecting which of said trigger circuits respond to the camera flash output signal;

whereby operation of the camera simultaneously operates the selected bar or ring flash.

* * * * *